United States Patent
Trowbridge

(10) Patent No.: US 11,503,764 B2
(45) Date of Patent: Nov. 22, 2022

(54) HYDRAULIC SICKLE KNIFE DRIVE ON A COMBINE HEADER

(71) Applicant: CNH Industrial America LLC, New Holland, PA (US)

(72) Inventor: Jeffrey C. Trowbridge, Stevens, PA (US)

(73) Assignee: CNH Industrial America LLC, New Holland, PA (US)

(*) Notice: Subject to any disclaimer, the term of this patent is extended or adjusted under 35 U.S.C. 154(b) by 711 days.

(21) Appl. No.: 16/260,014

(22) Filed: Jan. 28, 2019

(65) Prior Publication Data

US 2020/0236853 A1 Jul. 30, 2020

(51) Int. Cl.
| | |
|---|---|
| *A01D 41/14* | (2006.01) |
| *A01D 34/80* | (2006.01) |
| *A01D 41/127* | (2006.01) |
| *A01D 43/10* | (2006.01) |
| *F16H 61/4061* | (2010.01) |
| *F16H 61/4139* | (2010.01) |

(52) U.S. Cl.
CPC ........... *A01D 41/142* (2013.01); *A01D 34/80* (2013.01); *A01D 41/1274* (2013.01); *A01D 43/105* (2013.01); *F16H 61/4061* (2013.01); *F16H 61/4139* (2013.01)

(58) Field of Classification Search
CPC .... A01D 41/142; A01D 41/127; A01D 34/80; A01D 43/105
See application file for complete search history.

(56) References Cited

U.S. PATENT DOCUMENTS

| | | | | |
|---|---|---|---|---|
| 4,009,556 | A * | 3/1977 | Molzahn | A01D 69/00 56/10.7 |
| 5,462,486 | A * | 10/1995 | Norton | A01D 41/142 460/20 |
| 5,527,218 | A * | 6/1996 | Van den Bossche | A01D 41/142 460/116 |
| 5,791,128 | A * | 8/1998 | Rogalsky | A01D 41/142 56/10.9 |
| 6,116,006 | A | 9/2000 | Killen et al. | |

(Continued)

FOREIGN PATENT DOCUMENTS

| | | |
|---|---|---|
| CA | 2522387 A1 | 4/2007 |
| EP | 3348131 A1 | 7/2018 |

OTHER PUBLICATIONS

PCT International Search Report for PCT application PCT/US2020/015348, dated May 29, 2020 (11 pages).

*Primary Examiner* — Thomas B Will
*Assistant Examiner* — Joan D Misa
(74) *Attorney, Agent, or Firm* — Peter Zacharias; Patrick Sheldrake

(57) ABSTRACT

A sickle knife drive for an agricultural vehicle generally includes a first pump, a first motor, a second motor and a drive manifold having a plurality of connections used for connecting to other devices of the sickle knife drive and/or to devices outside of the sickle knife drive. Operation of the first pump in a forward direction causes the first motor to drive a sickle knife gearbox to cut a crop. During the forward direction, the second motor provides cooling to the fluid circuit. When the first pump direction is reversed, the agricultural vehicle supplements a fluid flow to the fluid circuit to clear any jammed crop from the sickle knives.

9 Claims, 7 Drawing Sheets

(56) References Cited

U.S. PATENT DOCUMENTS

| | | |
|---|---|---|
| 7,467,505 B2 | 12/2008 | MacGregor |
| 7,730,701 B1 | 6/2010 | Ehrhart et al. |
| 9,320,198 B2 | 4/2016 | Trowbridge et al. |
| 9,717,179 B2 | 8/2017 | Trowbridge |
| 2003/0110749 A1 | 6/2003 | Frego |
| 2017/0127609 A1 | 5/2017 | Dunn et al. |

* cited by examiner

HYDRAULIC SICKLE KNIFE DRIVE ON A COMBINE HEADER

FIELD OF THE INVENTION

The present invention relates to agricultural harvesters, and, more specifically to the cutter bar of the header of agricultural harvesters.

BACKGROUND OF THE INVENTION

An agricultural vehicle known as a "combine" is historically termed such because it combines multiple harvesting functions with a single harvesting unit, such as picking, threshing, separating, and cleaning. A combine generally includes a header, a feeder housing, a threshing rotor, and various other systems for the separation, cleaning, and temporary storage of the crop material. The header removes the crop material from a field and transports the crop material to the feeder housing.

A typical header for an agricultural vehicle includes one or more cutters, e.g., cutter bars with reciprocating knives, which cut the crop material that is harvested from the field. Generally, the cutter bars are driven in a linearly reciprocal manner by a knife drive, such as a "wobble box" or epicyclic gear drive. The knife drive is usually powered by a mechanical drivetrain that extends from the combine. Thereby, the knife drive converts rotary motion from the mechanical drivetrain into a linear motion that drives the cutter bar.

The cutter bar of the header typically includes a reciprocating blade moving atop a bar on which there are mounted fingers with stationary guard plates. The reciprocating blade operates in a channel on the bar and has very sharp sickle sections (triangular blades). The reciprocating blade is driven back and forth along the channel. The plant matter, is cut between the sharp edges of the sickle sections and the finger guard plates.

A typical header includes one or more cutters, e.g., cutter bars with reciprocating knives, which cut the crop material that is harvested from the field. Once the crop material is cut, a conveyor system, which is positioned rearwardly of the cutter(s), catches the crop material and transports it to the feeder housing. The header may also include a rotating reel with tines or the like to sweep the crop material towards the cutter(s). Modern headers generally have cutters and attachments which are specifically optimized to harvest a particular kind of crop material.

A typical header generally includes a frame, a pair of end dividers at the lateral ends of the frame, a cutter to remove crop material from the field, and a conveyor to transport the cut crop material to the feeder housing for further downstream processing in the combine. Generally, these features of a header are specifically optimized to harvest a particular kind of crop material. For instance, the header may be in the form of a draper header which has a cutter bar, a draper belt, and a rotating reel with tines or the like in order to harvest a bushy or fluffy crop material, such as soy beans or canola. Alternatively, the header may be in the form of a corn header which includes an auger and row units with snouts, gathering chains, and stalk rolls for harvesting corn.

Draper headers may further include a reel drive assembly for rotating the reel. A typical reel drive assembly can include a hydraulic motor connected to the reel and various hydraulic fluid lines which fluidly couple the hydraulic motor to the onboard hydraulic system of the combine. The hydraulic motor may selectively rotate the reel at a desired rotational speed for accommodating a crop condition and/or ground speed of the combine. However, the operating parameters of the hydraulic motor may prevent the reel drive assembly from adequately accommodating some crop conditions.

SUMMARY OF THE INVENTION

In one exemplary embodiment formed in accordance with the present disclosure, there is provided a sickle knife drive for a plurality of sickle knives on an agricultural combine header of a combine. The sickle knife drive includes a drive manifold, a first pump, a first motor and a second pump. The drive manifold includes a plurality of connections, e.g. a first pump connection, a first motor connection, a second motor connection, a combine connection and a manifold case drain connection. The combine connection and the manifold case drain are configured for connecting to the combine. The first pump is in fluid connection with the first pump connection and is configured to mechanically couple to a power transmission device. The first pump includes a first pump case drain that is configured to connect to the combine. The first pump creates a system state, e.g. a forward state, a reverse state and a neutral state. The drive manifold has a forward position during the forward state, a reverse position during the reverse state and either the forward position or the reverse position during the neutral state. The first motor is in fluid connection with the first motor connection and is configured to drive a sickle knife gear box. The first motor includes a first motor case drain that is connected to the combine. The second motor is in fluid connection with the second motor connection.

In another exemplary embodiment formed in accordance with the present disclosure, there is provided a method of adding a sickle knife drive to sickle knives on an agricultural combine header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
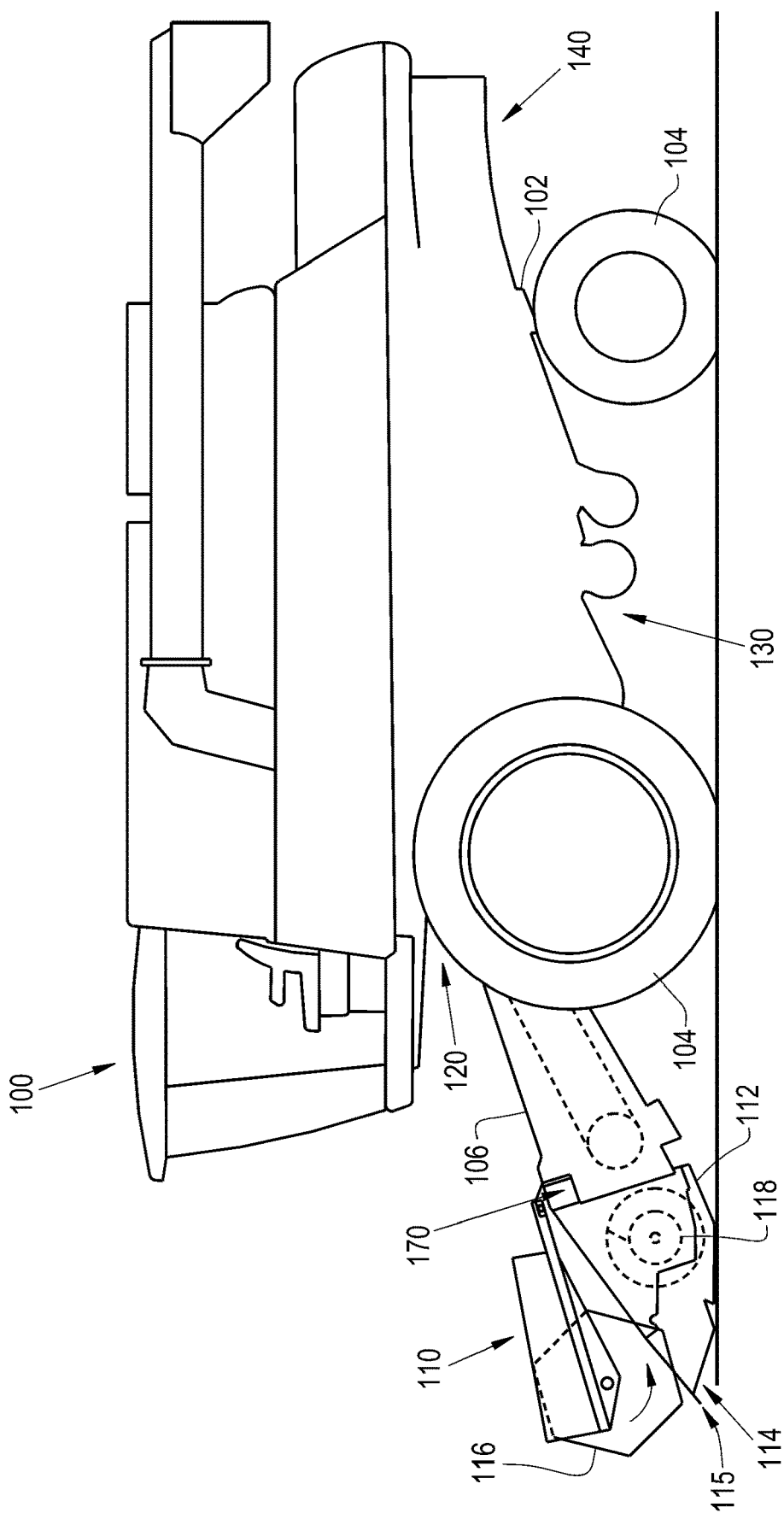
FIG. 1 illustrates a side view of an agricultural vehicle including a header, in accordance with an exemplary embodiment of the present invention.

Referring now to the drawings, and more particularly to FIG. 1, there is shown an exemplary embodiment of an agricultural vehicle 100 in the form of a combine. However, the agricultural vehicle 100 may be in the form of any desired agricultural vehicle 100, such as a windrower. The agricultural vehicle 100 generally includes a chassis 102, ground engaging wheels 104, a feeder housing 106, and a prime mover 108. The agricultural vehicle 100 may also include a header 110, a separating system 120, a cleaning system 130, a discharge system 140, an onboard grain tank 150, and an unloading auger 160. Although the agricultural vehicle 100 is shown as including wheels 104, in an alternative exemplary embodiment the agricultural vehicle 100 may include tracks, such as full tracks or half-tracks.

The header 110 is removably attached to the feeder housing 106. The header 110 generally includes a frame 112, a cutter bar 114 having a plurality of sickle knives 115 used to sever the crop from a field, a rotatable reel 116 rotatably mounted to the frame 112 which feeds the cut crop into the header 110, and an auger 118 with flighting that feeds the severed crop inwardly from each lateral end of the frame 112 toward feeder housing 106. The reel 116 may be in the form of any desired reel. The header 110 further includes the sickle knife drive 170 configured to drive the sickle knives 115.

Figure 2:
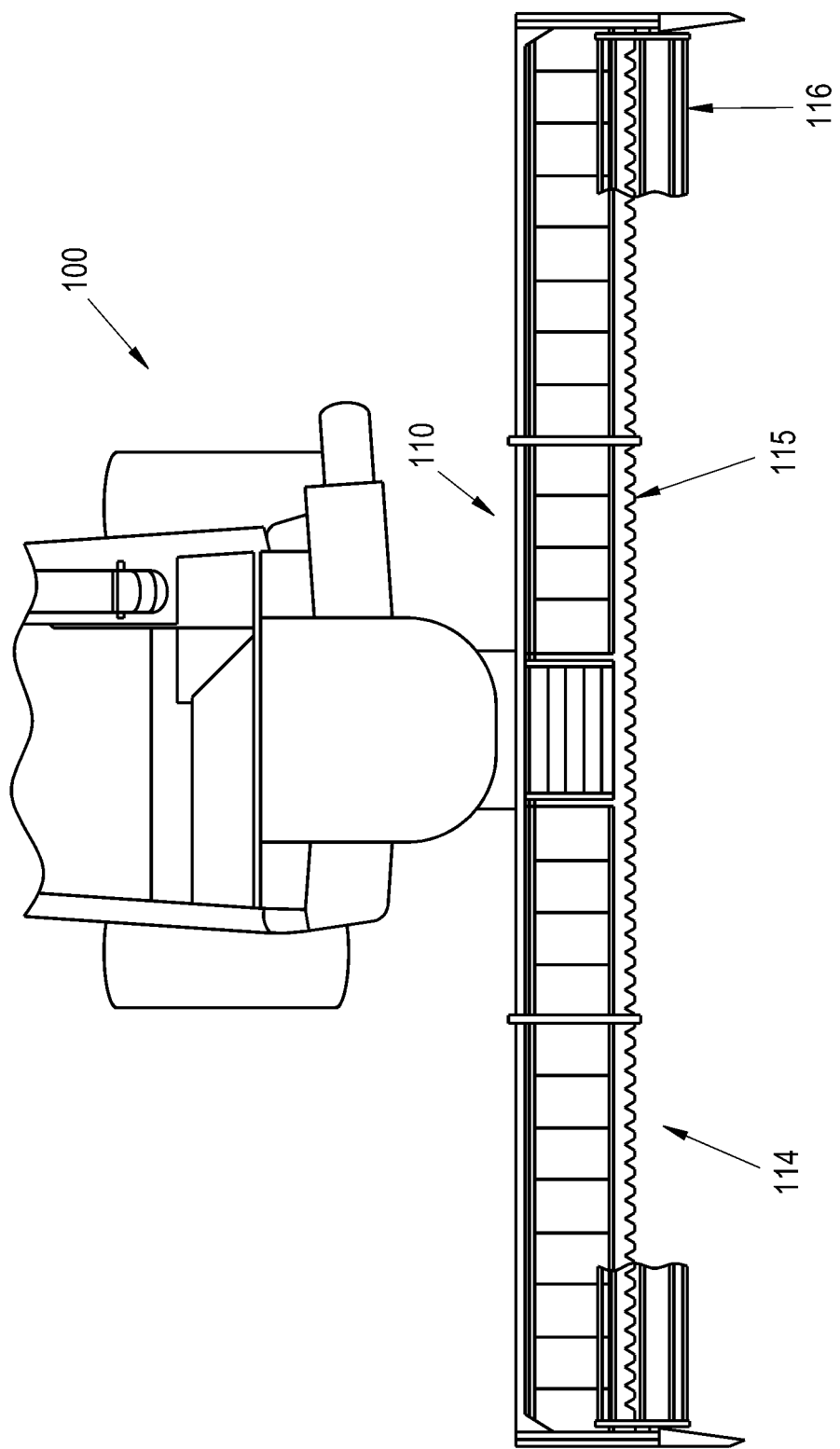
FIG. 2 is a top view of the embodiment shown in FIG. 1.

Referring now to FIG. 2, there is shown a top view of the agricultural vehicle 100 shown in FIG. 1 with a cutaway of the rotatable reel 116 showing the cutter bar 114 with the plurality of sickle knives 115.

Figure 3:
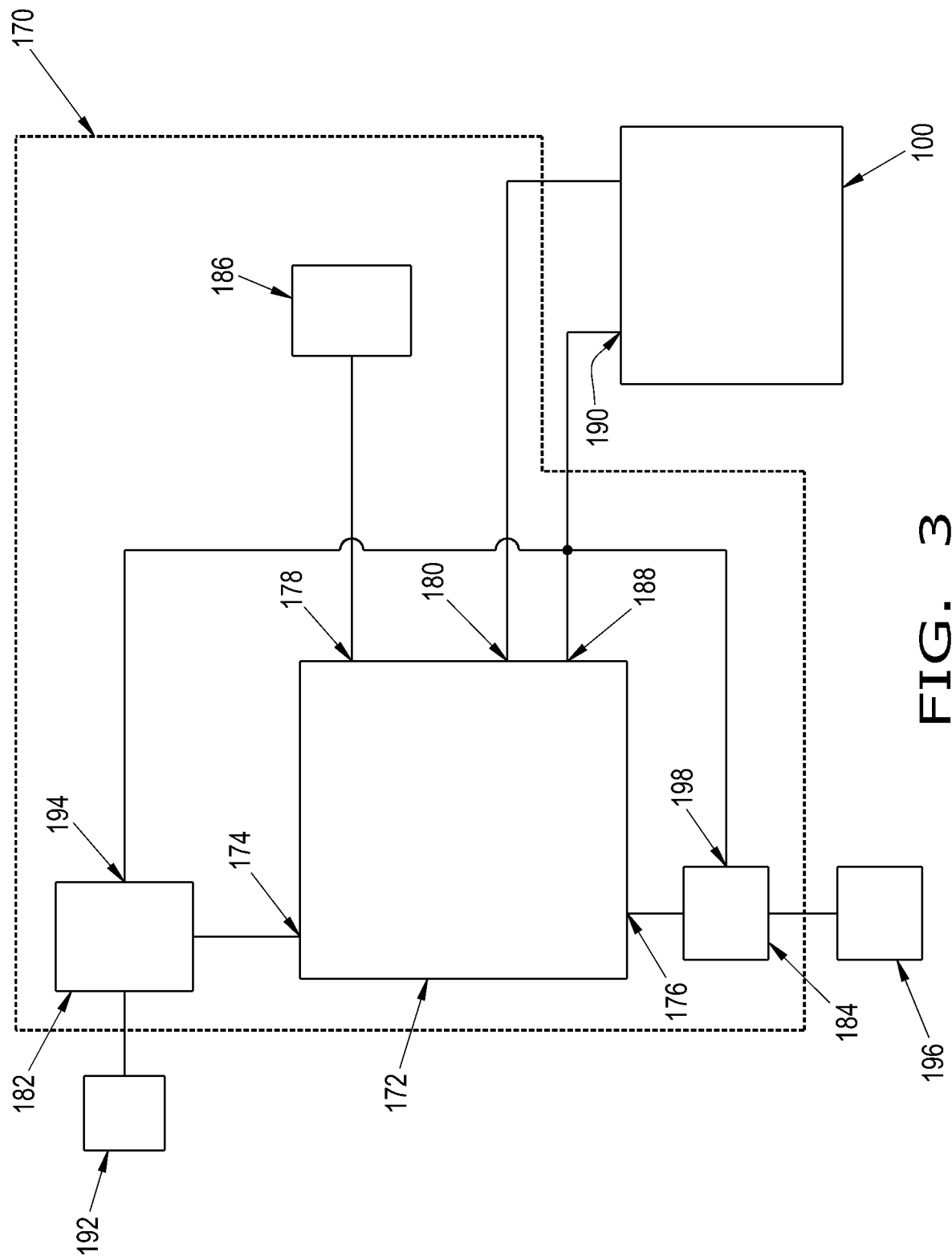
FIG. 3 is a block diagram of a sickle drive, in accordance with an exemplary embodiment of the present invention.

Shown in FIG. 3 is a block diagram of a sickle knife drive 170 represented inside of the dashed lines. The sickle knife drive 170 generally includes a drive manifold 172 having a plurality of connections used for connecting to other devices of the sickle knife drive 170 and/or to devices outside of the sickle knife drive 170. The plurality of connections may include a first pump connection 174, a first motor connection 176, a second motor connection 178 and a combine connection 180. The drive manifold 172 is configured to fluidly connect with the combine connection 180, e.g. hydraulically, to an agricultural vehicle 100. The drive manifold 172 further includes a manifold case drain 188 connecting to the agricultural vehicle 100. The connection between the manifold case drain 188 and the agricultural vehicle 100 may be of any type of connection suitable for a hydraulic link, e.g. permanent or quick connect. The drive manifold 172 may be configured with various pilot operated valves and controls typical for use in hydraulic systems, e.g. check valves, directional valves, needle valves or flow controls, in order to direct a flow. The drive manifold 172 may be configured to provide a forward flow unless the drive manifold 172 is subjected to a reverse flow thereby causing the system to develop pressure and shift the various pilot operated valves to the reverse flow. It is to be understood that the drive manifold 172 may instead be configured to provide a reverse flow unless the drive manifold 172 is subjected to a forward flow thereby causing the system to develop pressure and shift the various pilot operated valves to the forward flow. The sickle knife drive 170 further includes a first pump 182, a first motor 184 and a second motor 186.

The first pump 182 may be of any type of pump suitable for pumping a fluid, e.g. a single gear pump, and is fluidly connected to the drive manifold 172 at the first pump connection 174. The fluid connection between the first pump 182 and the first pump connection 174 may be of any connection suitable for hydraulic fluid, e.g. flexible hose or hard lines, where pressures may exceed 3000 psi. The first pump is configured to connect, e.g. electrically, mechanically or fluidly, to a power transmission device 192, e.g. generator, power take off or pump, where the power transmission device 192 may turn the first pump 182 in a forward direction, a reverse direction or not at all. A controller (not shown) located on the agricultural vehicle 100 may be used to select the forward or reverse direction or to stop the power transmission device 192 thus providing no rotation to the first pump 182. The sickle knife drive 170 is in a forward state when the power transmission device 182 is turning the first pump 182 in the forward direction, a reverse state when the power transmission device 182 is turning the first pump 182 in the reverse direction and a neutral state when the power transmission device 182 is not turning the first pump 182 in either direction. The first pump 182 may also include a first pump case drain 194 connected to the agricultural vehicle 100. The connection between the first pump 182 and the agricultural vehicle 100 may be of any type of connection suitable for a hydraulic link, e.g. permanent or quick connect.

The first motor 184 may be of any type of motor suitable for connecting to and driving a sickle knife gear box 196. The first motor 184 is fluidly connected to the drive manifold 172 at the first motor connection 176. The fluid connection between the first motor 184 and the first motor connection 176 may be of any connection suitable for hydraulic fluid, e.g. flexible hose or hard lines, where pressures may exceed 3000 psi. The first motor 184 includes a first case motor drain 198 connected to the agricultural vehicle 100. The connection between the first motor 184 and the agricultural vehicle 100 may be of any type of connection suitable for a hydraulic link, e.g. permanent or quick connect. The connection between the first motor 184 and the sickle knife gearbox 196 may be of any type suitable for driving a gear box, e.g. direct linkage, clutch or other gear box.

The second motor 186 may be of any type of motor suitable for connecting to and driving the rotatable reel 116. The second motor 186 is fluidly connected to the drive manifold 172 at the second motor connection 178. The fluid connection between the second motor 186 and the second motor connection 178 may be of any connection suitable for hydraulic fluid, e.g. flexible hose or hard lines, at low pressures.

The sickle knife drive 170 may be in one of three system states as dictated by the rotation direction of the first pump 182. The system states are a forward state, a reverse state and a neutral state. The forward state is defined as the state the system may be in during the harvesting of a crop, the reverse state is defined as the state the system may be in during clearing of crop jammed in the sickle knives 115 and the neutral state is defined the state the system may be in when not in the forward or reverse state. The sickle knife drive 170 is in a forward state when the power transmission device 192 is turning the first pump 182 in the forward direction, a reverse state when the power transmission device 192 is turning the first pump 182 in the reverse direction and a neutral state when the power transmission device 192 is not turning the first pump 182 in either direction. A controller (not shown) located on the agricultural vehicle 100 may be used to select the forward or reverse direction or to stop the power transmission device 192 thus providing no rotation to the first pump 182.

During the forward state of the sickle knife drive 170, the drive manifold 172 is in a forward flow position thereby allowing the first pump 182 to provide approximately 15 gallons per minute (gpm) of a forward flow to the first motor 184. The forward flow to the first motor 184 causes the first motor 184 to rotate in a forward direction. This forward rotation of the first motor 184 causes the sickle knives 115 to operate in a harvesting mode, i.e. cutting a crop. During the forward state of the sickle knife drive 170, the second motor 186 provides an additional forward flow of about 10-20% of the first pump 182. The additional forward flow from the second motor 186 is used to supplement and to cool the fluid in the circuit between the first pump 182 and the first motor 184. The second motor 196 may advantageously provide the additional forward flow at an output pressure of the second motor 196.

During the reverse state of the sickle knife drive 170, the drive manifold 172 is shifted to the reverse flow position by the first pump 182 operating in a reverse direction and creating a reverse flow. In other words, the default position of the drive manifold 172 is in the forward flow position. However, it is to be understood that the system may have a default position of a reverse flow position where a forward flow from the first pump 182 would cause the drive manifold 172 to shift from the reverse flow position to the forward flow position. The first pump 172, in the reverse flow provides 1.0-1.9 gpm to the first motor 184. The reverse flow to the first motor 184 causes the first motor 184 to rotate in a reverse direction. This reverse rotation of the first motor 184 causes the sickle knives 115 to operate in a cleaning mode, i.e. clearing a jammed crop. During the reverse state of the sickle knife drive, the second motor 186 does not supplement the reverse flow. The drive manifold 172 diverts a low flow from the agricultural vehicle 100 supplied to the second motor 186 during a forward flow position to the first motor 184 during a reverse flow position. The low flow of the agricultural vehicle to the second motor 186 is 5-10 gpm and to the first motor 184 is approximately 1.5 gpm. The additional low flow from the agricultural vehicle 100 to the first motor 184 advantageously supplements the flow from the first pump 182 to the first motor 184 thereby providing a consistent operation from of sickle knives 115, i.e. the flow rate to the first motor 184 is consistent. It is to be understood that the amount of flow that is required from the agricultural vehicle 100 may be adjusted dependent upon the rotational speed of the power transmission device 192. In other words, the amount of flow required to be supplemented may be low on an agricultural vehicle 100 having a power transmission device 192 with a high rotational speed; whereas, the amount of flow required to be supplemented may be high on an agricultural vehicle 100 having a power transmission device 192 with a low rotational speed.

During the neutral state of the sickle knife drive 170, the drive manifold 172 is not in a forward flow or reverse flow position. The drive manifold 172 may be configured to have a default forward flow position or a reverse flow position when the system pressure is 0 psi. Therefore, as the first pump 182 is not in the forward or reverse direction, the flow provided through the sickle knife drive 170 is 0 gpm.

The sickle knife drive 170 may be added to any agricultural vehicle 100 having a mechanical or hydraulic system utilized for driving the sickle knives 115. In a configuration using a mechanical drive, the mechanical drive unit (not shown) used to drive the sickle knives 115 may be replaced with a sickle knife drive 170. In a configuration with a hydraulic drive, the addition of fluid lines from the second motor 186 to the drive manifold 172 are required and case drains must be added between agricultural vehicle 100 and the first pump 182, the first motor 184 and the drive manifold 172. A software upgrade to the controller (not shown) may be required for both configurations.

Figure 4:
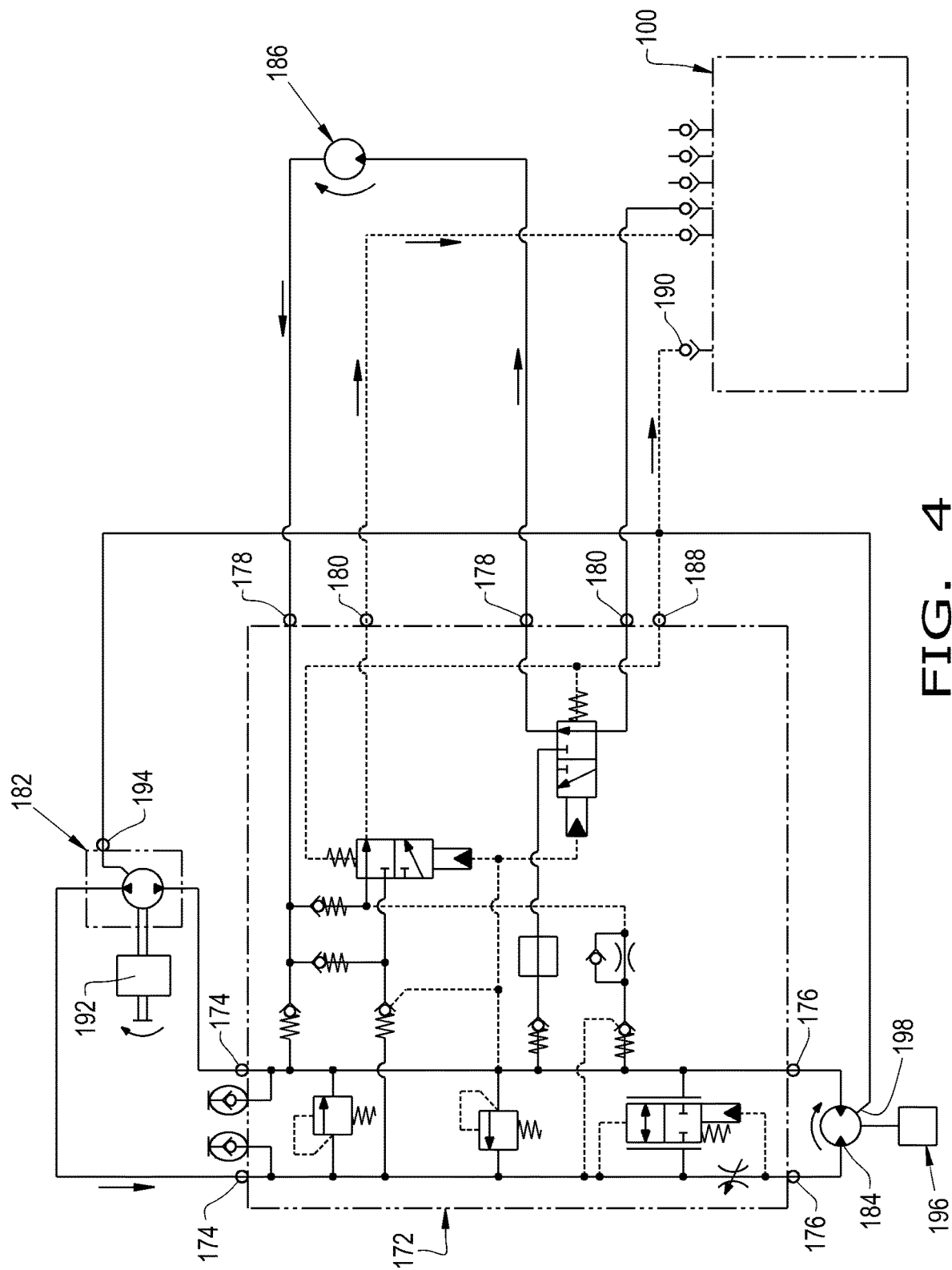
FIG. 4 is a block diagram of a sickle drive in a forward state, in accordance with another exemplary embodiment of the present invention.

Referring now to FIG. 4, there is shown a block diagram of a sickle knife drive 170 in a harvest mode with the drive manifold 172 in the forward flow position.

Figure 5:
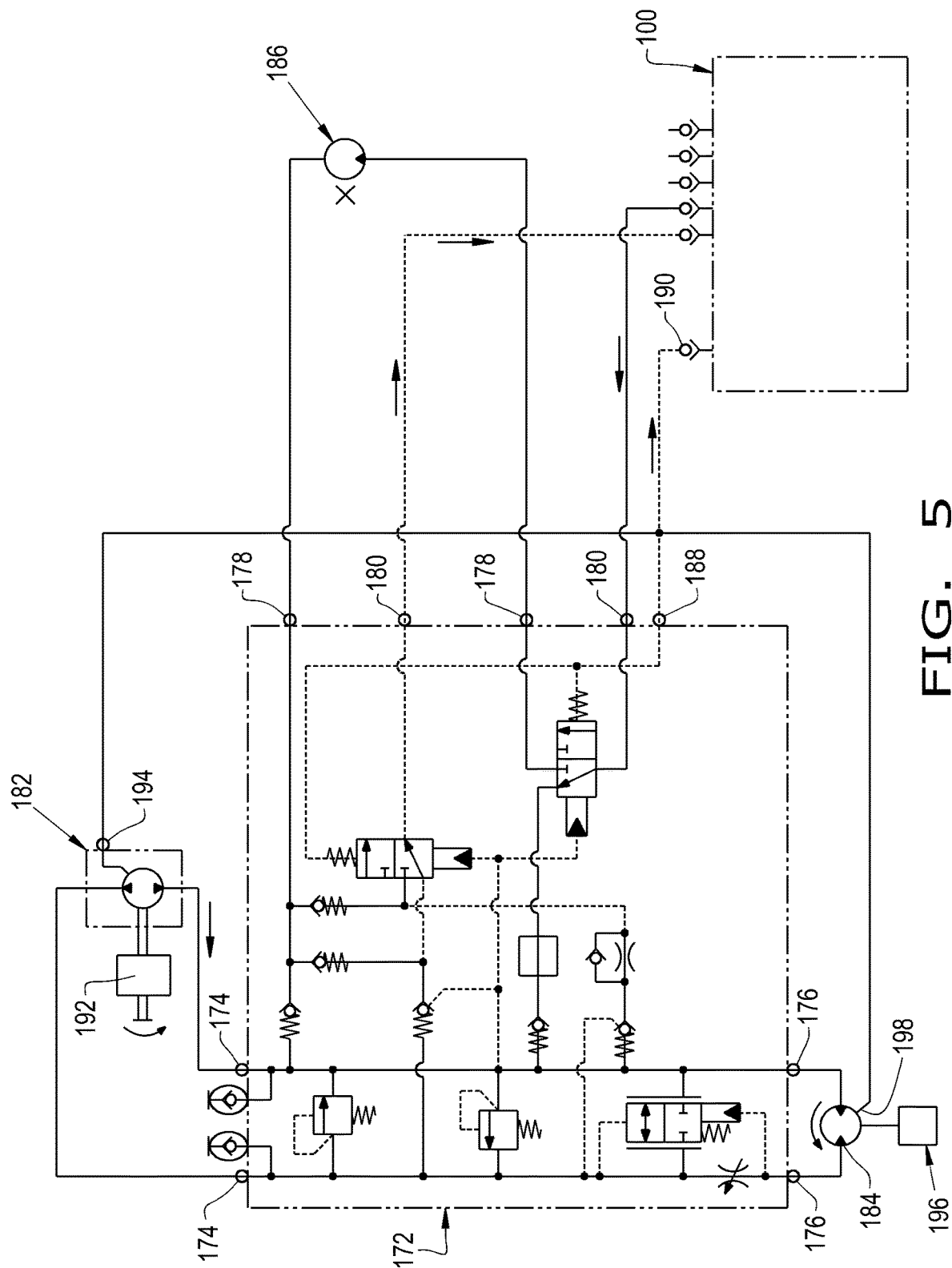
FIG. 5 is a block diagram of a sickle drive in a reverse state, in accordance with the exemplary embodiment shown in FIG. 4.

Referring now to FIG. 5, there is shown a block diagram of a sickle knife drive 170 in a cleaning mode with the drive manifold 172 in the reverse flow position.

Figure 6:
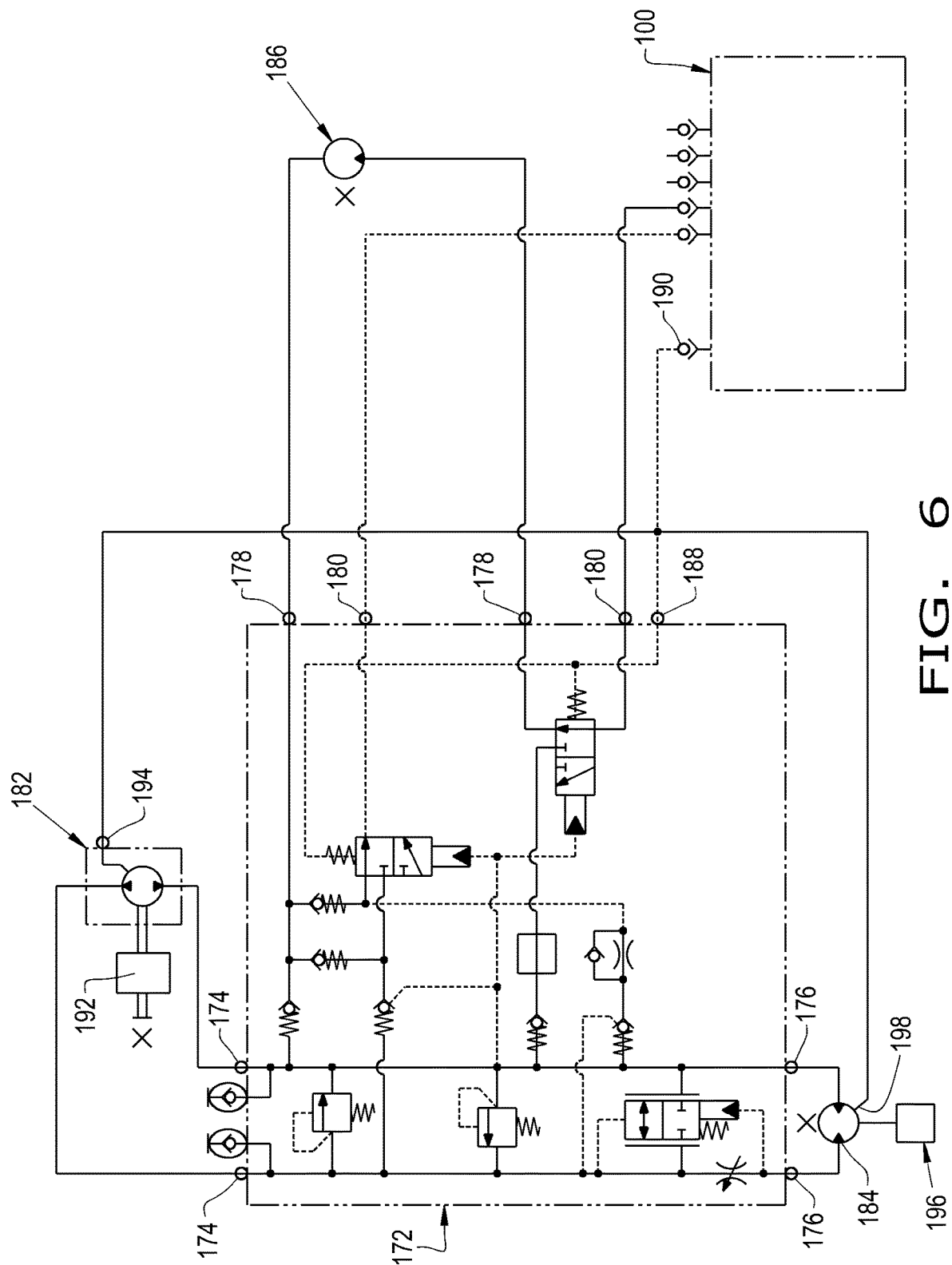
FIG. 6 is a block diagram of a sickle drive in a neutral state, in accordance with the exemplary embodiment shown in FIG. 4.

Referring now to FIG. 6, there is shown a block diagram of a sickle knife drive 170 in a neutral mode with the drive manifold 172 in the forward flow position.

Figure 7:
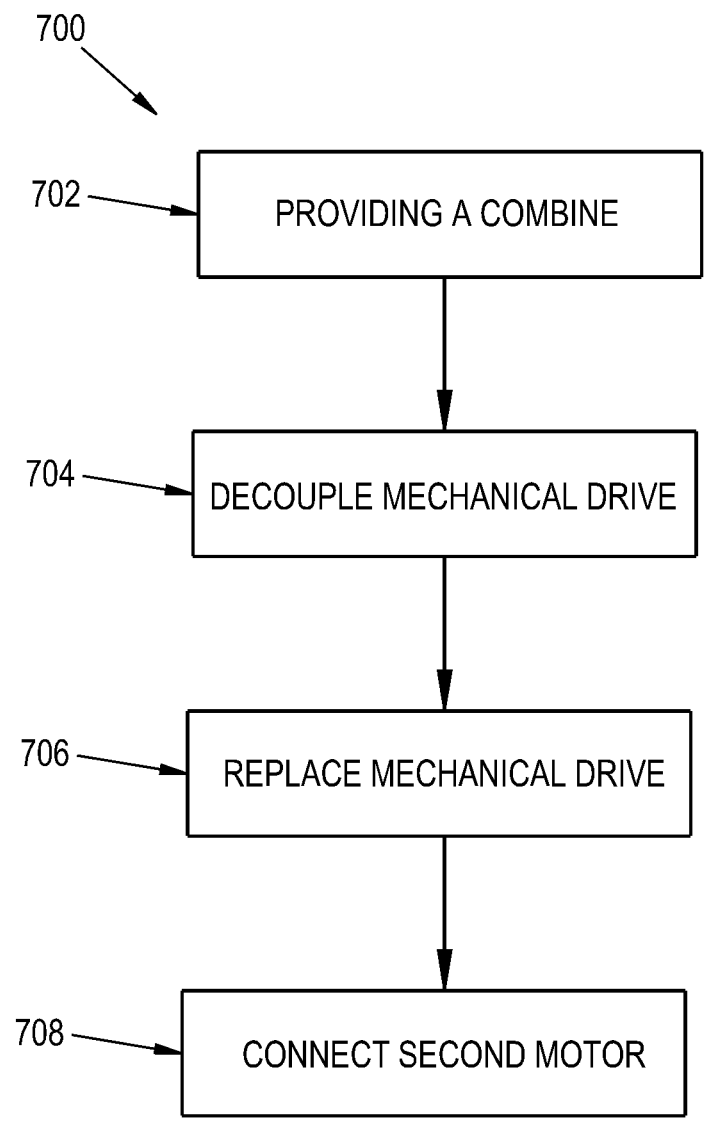
FIG. 7 is a flowchart of an embodiment of a method of the present invention for modifying an agricultural harvester with a mechanical sickle drive.

Referring now to FIG. 7, there is shown a method 700 of adding a sickle knife drive 170 to sickle knives 115 on an agricultural combine header. The method 700 generally includes the steps of providing a combine including an agricultural combine header with the sickle knives coupling with a sickle knife gear box that is driven by a mechanical drive. The combine further including a manifold, a low pressure tank, a software device configured to control the mechanical drive and a power transmission device (step 702). Decoupling the mechanical drive from the sickle knives (step 704). Replacing the mechanical drive with a drive manifold, a first pump and a first motor. The drive manifold includes a plurality of connections, e.g. a first pump connection, a first motor connection, a second motor connection, a combine connection and a manifold case drain connection. The combine connection connects to the manifold and the manifold case drain connects to the low pressure tank. The first pump is in fluid connection with the first pump connection and is mechanically coupled to the power transmission device. The first pump includes a first pump case drain that connects to the low pressure tank. The first pump creates a system state, e.g. a forward state, a reverse state and a neutral where the drive manifold has a forward position during the forward state, a reverse position during the reverse state and either the forward position or the reverse position during the neutral state. The first motor is in fluid connection with the first motor connection and connects to the sickle knife gear box. The first motor includes a first motor case drain connecting to the low pressure tank (step 706). Arranging a second motor provided with the combine to be in fluid connection to the second motor connection (step 708).

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A sickle knife drive for a cutter bar on a header of an agricultural combine, the sickle knife drive comprising:
    a hydraulic drive manifold having a plurality of connections comprising a first pump connection, a first motor connection, a second motor connection, a combine connection, and a manifold case drain connection, the combine connection being configured for connecting to the combine, the manifold case drain connection being configured to connect to the combine;
    a first pump in fluid connection with the first pump connection and configured to mechanically couple to a power transmission device, the first pump comprising a first pump case drain being configured to connect to the combine, the first pump creating at least one system state comprising at least one of a forward state, a reverse state, and a neutral state, the hydraulic drive manifold comprising a forward position during the forward state, a reverse position during the reverse state, and either the forward position or the reverse position during the neutral state;

a first motor in fluid connection with the first motor connection and configured to drive a sickle knife gear box, the first motor comprising a first motor case drain being configured to connect to the combine, the first motor operating in a reverse direction when in the reverse state with a reverse flow through the first motor; and a second motor in fluid connection with the second motor connection, the second motor providing a flow that supplements fluid in a circuit between the first pump and the first motor in the forward state and no flow during the reverse state, the second motor not supplementing the reverse flow, wherein the hydraulic drive manifold is configured to divert a low flow supplied to the second motor during the forward state to the first motor during the reverse state.

2. The sickle knife drive of claim 1, wherein the second motor is a reel drive motor.

3. The sickle knife drive of claim 1, wherein the second motor provides approximately 2 gpm of fluid flow during the forward state and approximately 0 gpm during in the reverse state.

4. The sickle knife drive of claim 1, wherein the combine comprises a quick coupler for connection with the manifold case drain connection, the first pump drain and the second motor.

5. The sickle knife drive of claim 1, wherein the first pump provides approximately 15 gpm of fluid flow during the forward state and approximately 1-1.9 gpm during the reverse state.

6. The sickle knife drive of claim 1, wherein the first motor drives the sickle knife gear box in a harvest mode during the forward state and in a cleaning mode during the reverse state.

7. The sickle knife drive of claim 1, wherein the drive manifold is in the forward position when the system state is in the neutral state.

8. The sickle knife drive of claim 5, wherein the combine provides 5-10 gpm of fluid flow during the forward state and approximately 1.5 gpm during the reverse state.

9. The sickle knife drive of claim 1, further comprising at least one drain configured to drain an excess fluid to the combine.

* * * * *